(12) United States Patent
Sterling

(10) Patent No.: US 6,668,971 B2
(45) Date of Patent: *Dec. 30, 2003

(54) PNEUMATIC HAND TOOL EXHAUST MUFFLER HAVING INNER AND OUTER TUBES

(76) Inventor: Robert E. Sterling, 22711 N. Glen Dr., Colbert, WA (US) 99005

( * ) Notice: Subject to any disclaimer, the term of this patent is extended or adjusted under 35 U.S.C. 154(b) by 190 days.

This patent is subject to a terminal disclaimer.

(21) Appl. No.: 09/825,384

(22) Filed: Apr. 2, 2001

(65) Prior Publication Data

US 2001/0013443 A1 Aug. 16, 2001

Related U.S. Application Data

(63) Continuation-in-part of application No. 09/431,294, filed on Oct. 29, 1999, now Pat. No. 6,209,678, which is a continuation-in-part of application No. 09/316,451, filed on May 21, 1999, now abandoned, which is a continuation of application No. 09/082,293, filed on May 19, 1998, now Pat. No. 5,909,016, which is a continuation-in-part of application No. 08/999,588, filed on Jan. 13, 1998, now Pat. No. 5,952,623.

(51) Int. Cl.$^7$ ............... B21J 1/00; F01N 1/00
(52) U.S. Cl. ............ 181/230; 181/229; 181/252; 181/256; 181/258
(58) Field of Search ............... 181/230, 256, 181/258, 253, 229, 243, 252, 282; 173/DIG. 2; 55/276

(56) References Cited

U.S. PATENT DOCUMENTS

| | | |
|---|---|---|
| 3,526,293 A | 9/1970 | Hayes et al. |
| 3,667,571 A | 6/1972 | Fattelay |
| 3,675,732 A | 7/1972 | Rosen et al. |
| 3,719,251 A | 3/1973 | Fedrick |
| 3,811,251 A | 5/1974 | Gibel |
| 3,842,932 A | 10/1974 | Gibel |
| 3,880,245 A | 4/1975 | Anderson, Jr. |
| 3,880,252 A | 4/1975 | Mucka |
| 3,896,897 A | 7/1975 | Hillbush, Jr. |
| 4,033,428 A | 7/1977 | Wennerstrom |
| 4,082,160 A | 4/1978 | Schilling et al. |
| 4,134,472 A | 1/1979 | Trainor |
| 4,184,564 A | 1/1980 | Trainor |
| 4,205,732 A | 6/1980 | Auerbach et al. |
| 4,258,798 A | 3/1981 | Campbell et al. |
| 4,367,807 A | 1/1983 | Fink et al. |
| 4,565,259 A | 1/1986 | Stoll |
| 5,097,924 A | 3/1992 | Reeves |
| 5,418,339 A | 5/1995 | Bowen et al. |
| 5,500,494 A | 3/1996 | Ligman |
| 5,581,055 A | * 12/1996 | Self et al. ............ 556/148 |
| 5,731,556 A | 3/1998 | Gardner et al. |
| 5,767,459 A | 6/1998 | Sell |
| 5,847,334 A | * 12/1998 | Taga ............ 173/169 |

FOREIGN PATENT DOCUMENTS

| | | |
|---|---|---|
| FR | 1.519.853 | 4/1968 |
| FR | 2.570.759 | 3/1986 |
| TW | 417559 | 1/2001 |

* cited by examiner

*Primary Examiner*—Shih-Yung Hsieh
(74) *Attorney, Agent, or Firm*—Christensen O'Connor Johnson Kindness PLLC

(57) ABSTRACT

A muffler is provided for use in a pneumatic hand tool having a handle with an exhaust passage. The muffler includes an inner tube, an outer tube, an upper plate, and an end cap. The inner tube is located within the outer tube, with one or more openings being provided in each. The upper plate is located near the inner tube and is provided to close off the exhaust passage so that a majority of the exhaust air is directed into the inner tube during use. The end cap attaches to the handle for closing off the exhaust passage, but for one or more exit openings. During use, exhaust air enters the inner tube, flows out its penguins, flows out the outer tube openings, and flows out the exit opening in the end cap. The tortuous path slows the exhaust air and assists in dampening exhaust noise.

47 Claims, 10 Drawing Sheets

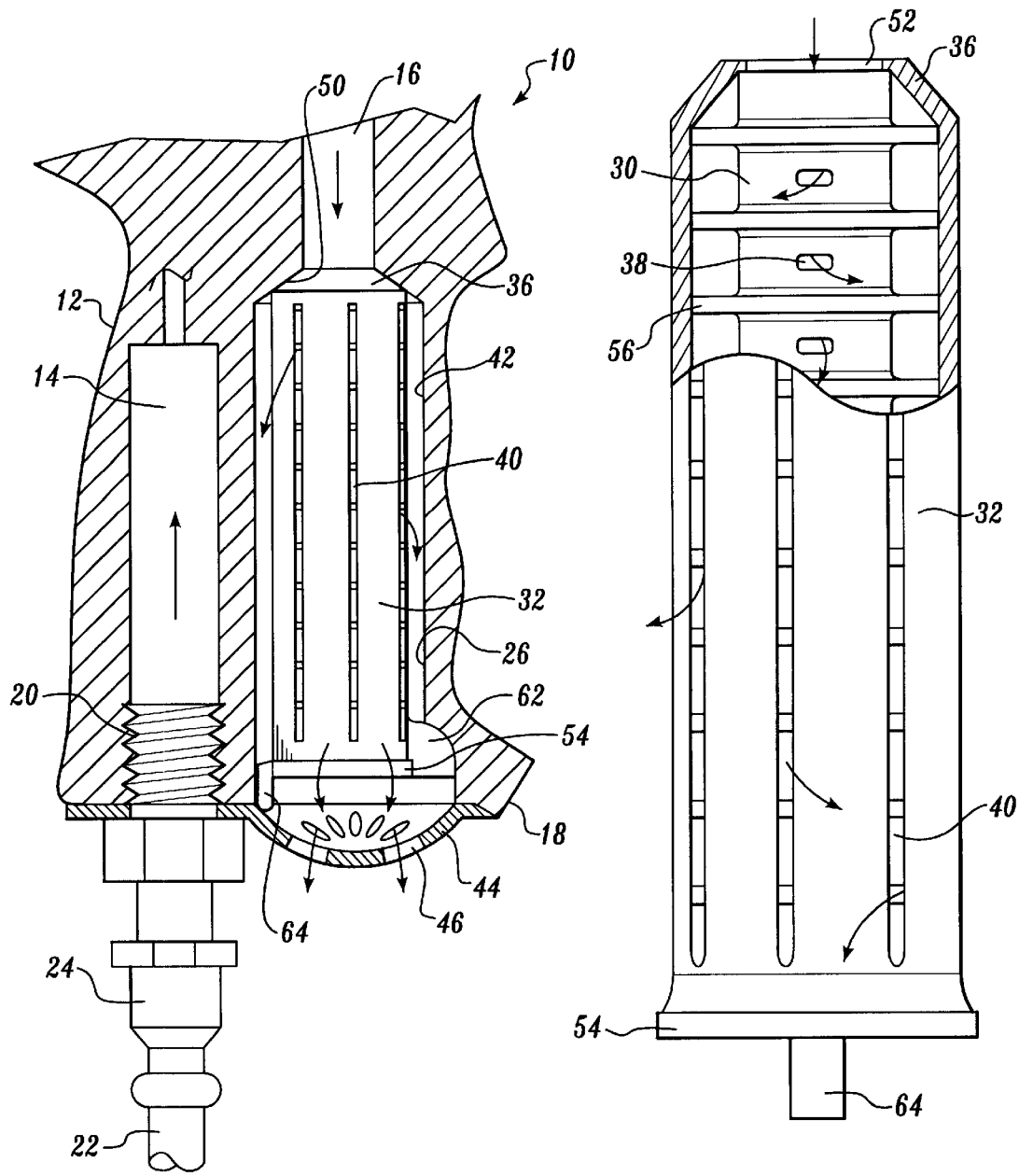

PNEUMATIC HAND TOOL EXHAUST MUFFLER HAVING INNER AND OUTER TUBES

CROSS-REFERENCE TO RELATED APPLICATIONS

This application is a continuation-in-part of U.S. application Ser. No. 09/431,294 filed Oct. 29, 1999, which is a continuation-in-part of U.S. application Ser. No. 09/316,451 filed May 21, 1999, which is a continuation of U.S. Pat. No. 5,909,016 filed May 19, 1998, which was a continuation-in-part of U.S. Pat. No. 5,952,623 filed Jan. 13, 1998, priority from the filing date of which is hereby claimed under 35 U.S.C. § 120.

FIELD OF THE INVENTION

The present invention relates to acoustics and sound modifying means for muffling and filtering air, and more particularly to devices for muffling and filtering air exhausted from pneumatically-operated hand tools, equipment, machines, and the like.

BACKGROUND OF THE INVENTION

Pneumatic hand tools are commonly used in industrial and residential settings. Various types of pneumatic hand tools are available, including ratchets, drills, wrenches, grinders, sanders, etc. Known hand tools typically include a handle having a hollow internal chamber. The chamber includes an air intake passage and an air exhaust passage. Each passage extends between a motor and an opening in the bottom surface of the handle. The portion of the intake passage located near its respective handle opening includes components adapted to connect to a standard air coupler or the like. The coupler is in communication with a pressured air supply source. The exhaust passage opens to the atmosphere. When exhaust air is vented from the hand tool, a considerable amount of noise and particulate debris is generated, potentially causing auditory and/or respiratory damage to the operator and others located nearby.

Although ear plugs and face masks are available to workers, they are often not used for a number of reasons—most typically because they are not convenient. Numerous attempts have been made by hand tool manufacturers, therefore, to reduce the amount of noise and particles generated by the hand tool itself. These attempts include designing quieter and cleaner motors and designing hand tool components that suppress noise and trap waste prior to expulsion from the hand tool. For example, U.S. Pat. No. 5,418,339 describes a pneumatic hand tool having an exhaust port filled with a web of non-woven fibers coated with a binder resin. These types of mufflers have had some success in muffling sound, but there is often an increase in back pressure to the motor causing a decrease in the operating efficiency of the hand tool. The operating efficiency of a tool is typically measured in the operating speed of the motor in revolutions per minute (rpm) at a certain gauge pressure.

Cylindrical canister-type combination muffler and air filters are known for large machines, such as hoists and presses. For example, U.S. Pat. No. 4,134,472 describes a combination muffler and air filter having a central tubular member with a number of slots. The tubular member is surrounded by a disposable canister having inner and outer perforated rigid cylinders encasing a series of stacked annular filter members. Exhaust air passes through the inner cylinder, into the filters, and out the outer cylinder. These devices are not typically used for hand tools, however, because of they are large, heavy, and difficult to maneuver.

Thus, there exists a need for a noise muffling system that can reduce sound levels and remove entrained solid and liquid contaminates from the exhausted air before it is discharged to the atmosphere. The ideal device would effectively muffle and filter the exhaust air without creating substantial amounts of back pressure. This would allow a hand tool to be operated without jeopardizing performance of the pneumatic tool over long periods of usage. The ideal muffling system would further attach to a hand tool body and remain attached even during significant tool vibrations. In addition, it would be desirable to have a muffler that can be easily attached to existing pneumatic hand tools. The present invention is directed to fulfilling these needs and others as described below.

SUMMARY OF THE INVENTION

In accordance with aspects of the present invention, a muffler is provided for use in a pneumatic hand tool having a handle with an exhaust passage. The muffler includes an inner tube, an outer tube, an upper plate, and end cap. The inner tube is located within the outer tube, with one or more openings being provided in each. The combination of inner tube and outer tube is located within the exhaust passage main section. The upper plate is located near the inner tube proximal end and is provided to close off the exhaust passage so that a majority of the exhaust air is directed into the inner tube during use. The end cap attaches to the handle for closing off the exhaust passage, but for one or more exit openings. During use, exhaust air enters the inner tube, flows out its openings, flows out the outer tube openings, and flows out the exit opening in the end cap. The tortuous path slows the exhaust air and assists in dampening exhaust noise. Various alternative embodiments are provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a partial cross-sectional side view of a second embodiment of a muffler formed in accordance with the present invention;

FIG. 3 is a partial cross-sectional side view of muffler components used in the embodiment of FIG. 2;

DETAILED DESCRIPTION OF THE PREFERRED EMBODIMENT

The present invention is a muffler for use in quieting exhaust expelled from a pneumatic hand tool. The present invention is compact, lightweight, and easy to use. In select embodiments, the muffler is adapted for immediate connection to known pneumatic hand tools, with only minimal changes required to the hand tool. A number of embodiments of the present invention are described below with reference to the accompanying drawings. It should be appreciated that these embodiments are provided to illustrate various features of the present invention, and thus should not be viewed as limiting with regard to the specific combination of their components.

Figure 1:
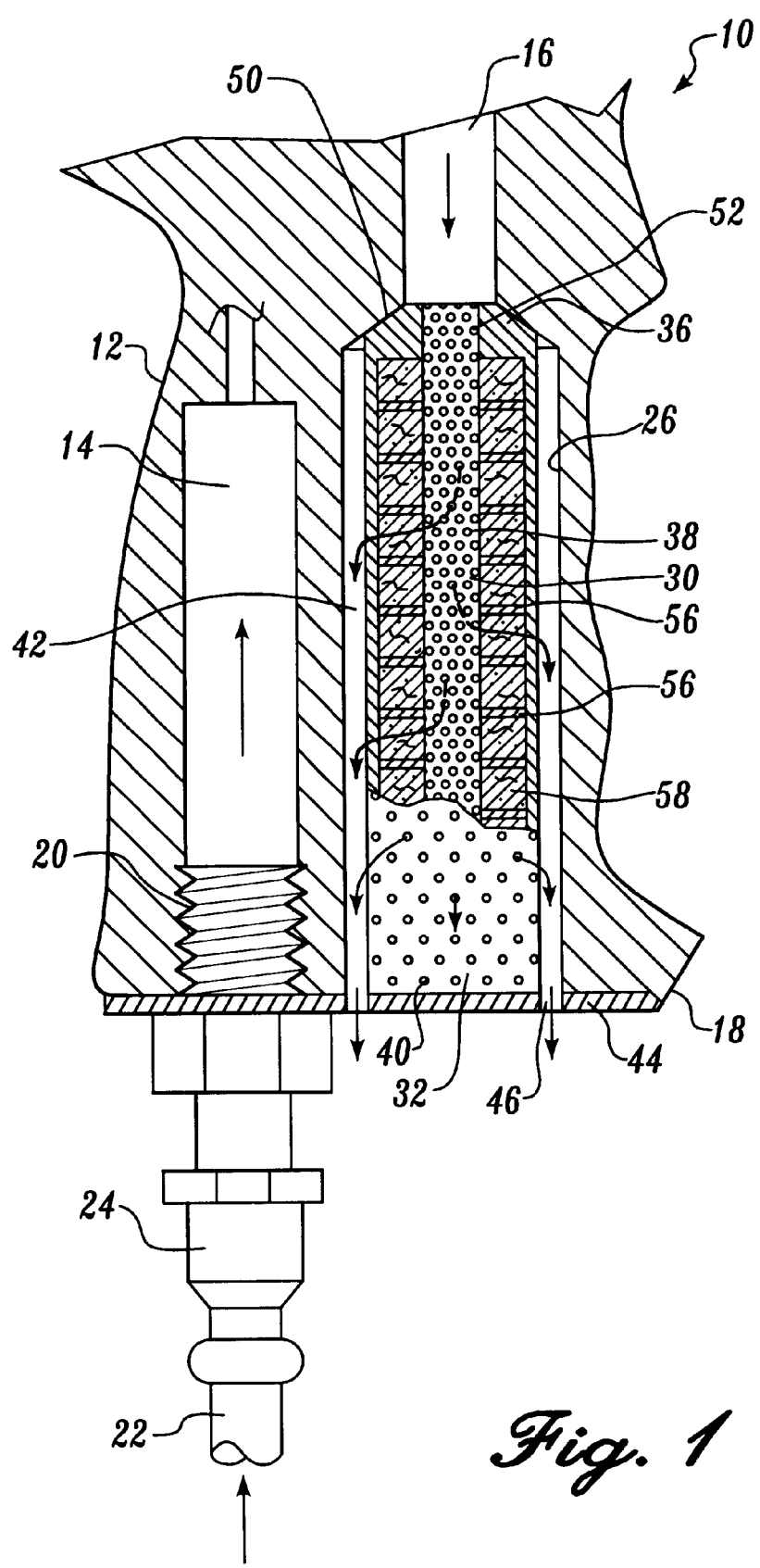
FIG. 1 is a partial cross-sectional side view of a first embodiment of a muffler formed in accordance with the present invention.

Referring to FIG. 1, a pneumatic hand tool 10 generally includes a handle 12 within which an air intake passage 14 and an air exhaust passage 16 extend into and end at respective openings in a bottom surface 18 of the handle. The opening of the air intake passage 14 includes threads 20 adapted to connect to an air supply line 22 via a standard air coupler 24 or the like. The supply line 22 is in communication with a pressured air supply source (not shown.) The exhaust passage includes a main section 26. The present invention muffler is received by the main section and is held therein using any one of a number of means, depending on the handle configuration of the tool.

Referring to FIG. 1, a muffler formed in accordance with the present invention includes an inner tube 30 and an outer tube 32, the combination being positioned within the exhaust passage main section. The inner tube 30 includes an upper, or proximal, end that is open to receive exhaust air from the exhaust passage. The inner tube is preferably formed of a rigid material such as a hard elastomer, metal, fiber, or cloth. An upper plate 36 helps direct exhaust air into the inner tube upper end. As used herein, the term "proximal" refers to a direction closer to the exhaust source. The term "distal" refers to a direction farther from the exhaust source.

The inner tube 30 further includes at least one other opening 38, and preferably, plural other openings. The additional opening 38 allows exhaust air to flow out of the inner tube. The outer tube 32 also includes at least one airflow opening 40. Depending on the pressure configuration of a particular hand tool, greater or fewer openings may be used in the tubes to help regulate the volume and speed of exiting exhaust air. The outer tube 32 is sized to provide a passageway 42 between itself and the wall surfaces of the main section. An end cap 44 is attachable to the handle for closing off the exhaust passage. The end cap 44 includes one or more exit openings 46 that release to atmosphere.

During use, exhaust air enters the inner tube proximal end, flows out the inner tube at least one opening, flows out the outer tube at least one airflow opening, passes through the passageway between the outer tube and the wall surfaces of the main section, and flows out the exit opening in the end cap. The tortuous path slows the exhaust air and assists in dampening exhaust noise.

Referring to the embodiments of FIGS. 1 and 2, the upper plate 36 is integrally formed with the proximal end of the outer tube and rests against a shoulder 50 formed in the exhaust passage main section. The upper plate 36 includes a central channel 52 that aligns with the inner tube proximal end. The upper plate 36 closes off the outer tube proximal end altogether. In the arrangements of FIGS. 1 and 2, the distal end of the inner tube end is closed. This forces exhaust air to exit the inner tube 30 laterally. In FIG. 1, the distal end of the inner tube 30 is closed by the end cap 44, with the exit openings 46 positioned outward of the outer tube 32. In FIG. 2, the distal ends of the inner tube 30 and outer tube 32 are closed by a separate closing cap 54.

Figure 5:
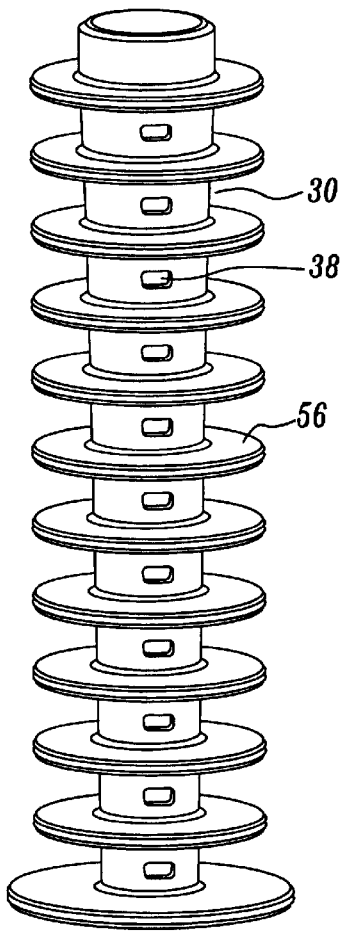
FIG. 5 is a perspective view of the inner tube of FIG. 2.

In the embodiments of FIG. 5, the inner tube 30 has a non-uniform diameter, particularly, a shape tapered smaller in the direction of the inner tube distal end. A number of dividers 56 are positioned along the inner tube 30, with each divider extending outwardly from the inner tube exterior surface toward the outer tube inner surface. In FIG. 1, the dividers are separate components from the inner tube itself. In FIGS. 3 and 5, the dividers are integrally formed with the inner tube 30. Optional washers 58 may be positioned in the spaces between the inner and out tubes. The washers may be formed from a known material, such as felt, gauze, rubber, foam, or synthetic material. In one embodiment, the dividers extend fully between the inner tube 30 and the outer tube 32 to force exhaust air to travel laterally through each washer 58 and not vertically between washers.

Figure 4:
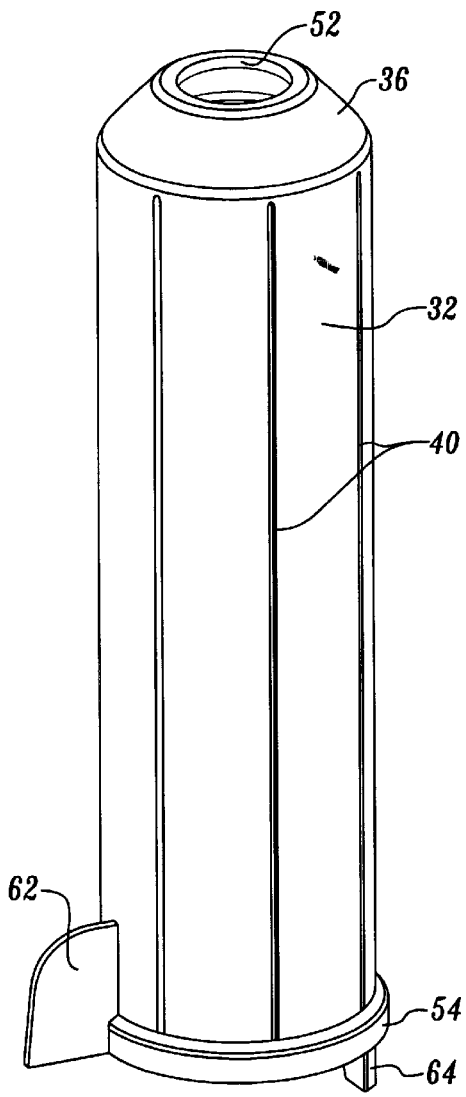
FIG. 4 is a perspective view of the outer tube of FIG. 2.
Figure 6:
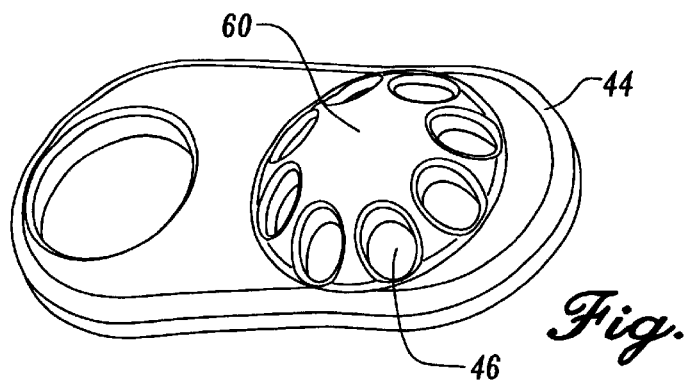
FIG. 6 is a perspective view of the end cap of FIG. 2.

In the embodiment of FIG. 2, the end cap 44 attaches to the handle for closing off the exhaust passage. The end cap 44 includes a bulbous surface 60 having a number of exit openings 46. See also FIG. 6. Referring back to FIG. 4, the outer tube 32 includes a longitudinal fin 62 and extension member 64 near the outer tube distal end. When the muffler is inserted into the exhaust passage main section, the fin inserts into a corresponding slot formed in the handle. The inserted fin keeps the muffler from rotating. Likewise, the extension member contacts the end cap 44 to keep the muffler from translating.

In the embodiments of FIGS. 1 and 2, the muffler accepts exhaust air in the inner tube 30 and forces the air to flow "outward" in order to discharge from the muffler. The embodiments of FIGS. 7, 8, 16, and 18 additionally require exhaust air to flow back "inward" into an inner tube in order to discharge from the muffler.

Figure 7:
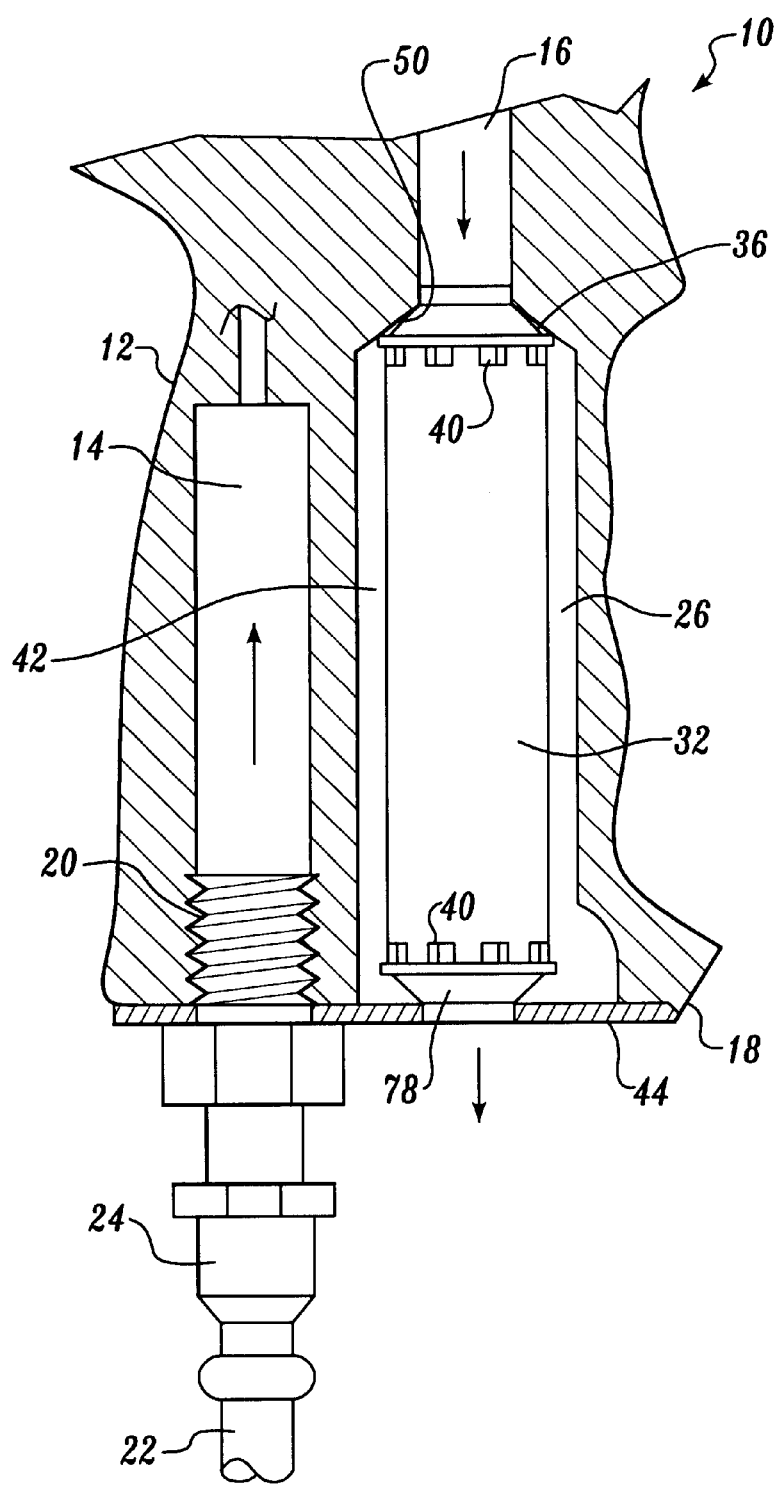
FIG. 7 is a partial cross-sectional side view of a third embodiment of a muffler formed in accordance with the present invention.
Figure 8:
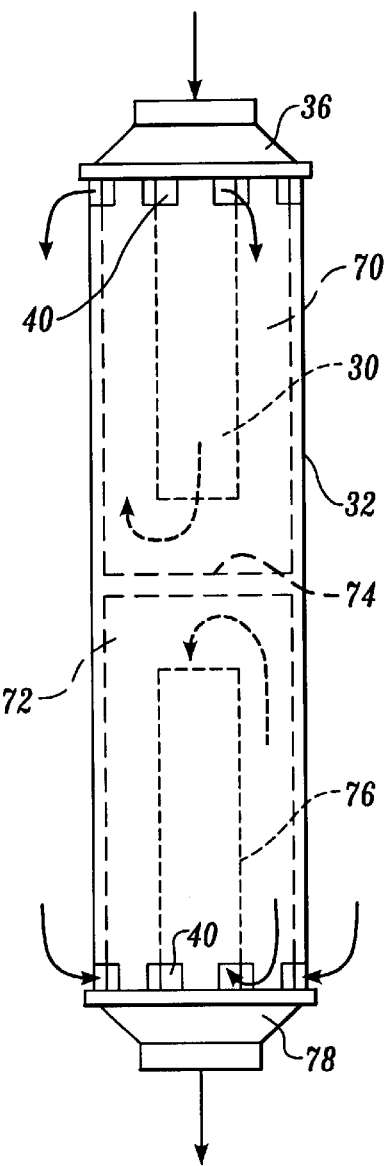
FIG. 8 is a side view of the muffler of FIG. 7.
Figure 9:
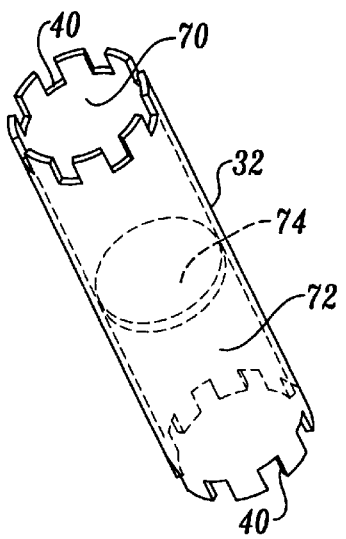
FIG. 9 is a perspective view of the outer tube of FIG. 7.

Referring to FIGS. 7, 8, and 9, a third embodiment of a muffler formed in accordance with the present invention is shown having an outer tube 32 that includes two compartments. A first compartment 70 is located above a second compartment 72, with a solid blocking plate 74 located between them. See also FIG. 9. The ends of the outer tube 32 are open, and a number of airflow openings 40 are provided in the side walls of both compartments. The airflow openings 40 shown are formed as scalloped edges at the proximal and distal outer tube ends. The first and second compartments 70, 72 of the outer tube are approximately the same size. This may varying depending on the particular application and hand tool involved. For example, the first compartment 70 may be approximately one-third the total size, with the second compartment 72 being two-thirds.

A separate, second inner tube 76 is provided and located in the outer tube second compartment 72. The second inner tube 76 includes an open distal end and at least one other opening 38. In this regard, the first and second inner tubes 30, 76 are similar in function, but reversed in orientation. In FIG. 7, the first inner tube 30 is formed integrally with the upper plate 36 and closes off the proximal end of the outer tube first compartment 70. The second inner tube 76 is formed integrally with a lower plate 78 and closes off the distal end of the outer tube second compartment 72. The exit opening 46 of the end cap 44 is located adjacent the lower plate and the open distal end of the second inner tube 76. Alternatively, an end cap 44 may be provided that functions as a lower plate instead.

The muffler embodiment of FIG. 7 is assembled by inserting the first inner tube 30 down into the outer tube first compartment 70; inserting the second inner tube 76 up into the outer tube second compartment 72; inserting the combination into the exhaust handle; and attaching the end cap 44 to the handle. During use, after the exhaust air passes into the passageway 42 between the outer tube 32 and the wall surfaces of the main section, the exhaust air flows into the airflow openings 40 of the second compartment 72, into the openings of the second inner tube 76, out the open distal end of the second inner tube 76, and out the exit opening 46 in the end cap 44.

Figure 10:
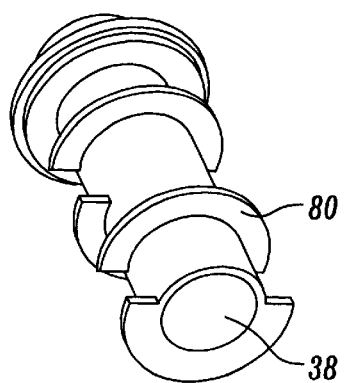
FIGS. 10, 11, 12, 13, 14, and 15 are perspective views of alternative embodiments of an inner tube formed in accordance with the present invention.
Figure 11:
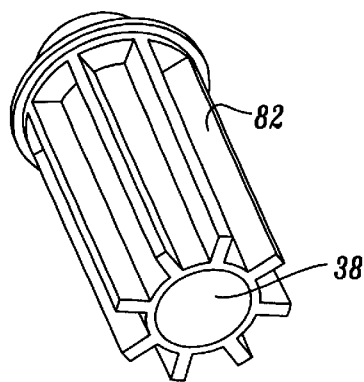
Figure 12:
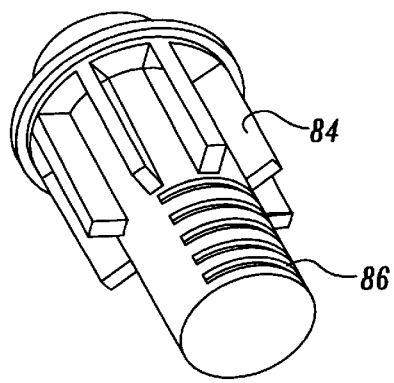
Figure 13:
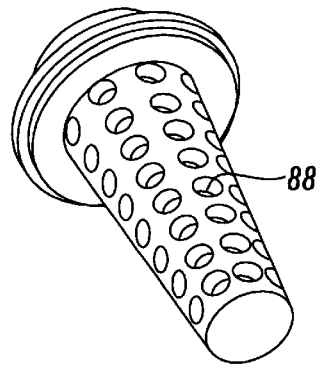
Figure 14:
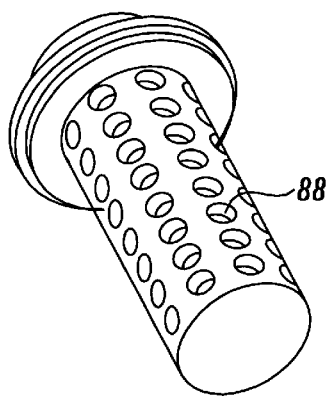
Figure 15:
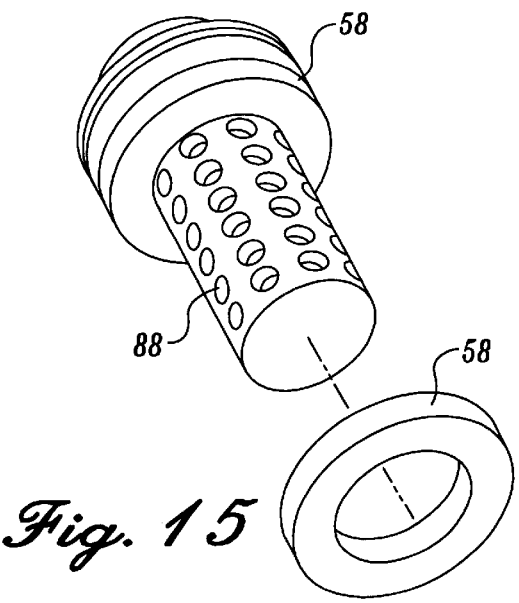

FIGS. 10–15 illustrate various inner tube configurations. In general, the additional opening in the inner tube may be located in the inner tube distal end, along inner tube side walls, or both. The arrangements of FIGS. 10 and 11 include a single opening provided in the inner tube distal end. FIG. 10 further includes a number of lateral baffles 80 placed on exterior side surfaces. FIG. 11 has a number of longitudinal flutes 82. Various other fins, or the like, may be used to direct air in a particular manner. In the arrangements of FIGS. 12–15, the distal end is closed and openings are provided along inner tube side walls. FIG. 12 includes longitudinal half flutes 84 and lateral slots 86. FIGS. 13, 14, 15, and 16 include circular holes 84. FIG. 13 further includes tapered side walls. FIG. 15 further includes washers 58 positioned about its circular holes. A plethora of others arrangements are possible as well.

Figure 16:
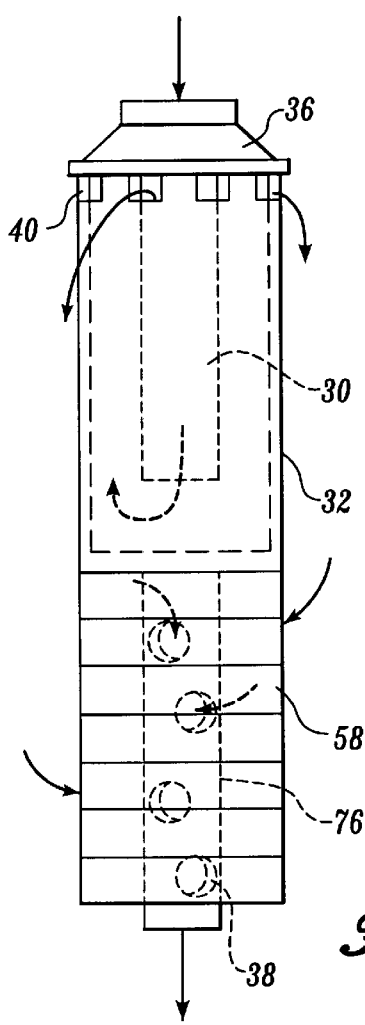
FIG. 16 is a side view of a fourth embodiment of a muffler formed in accordance with the present invention.
Figure 17:
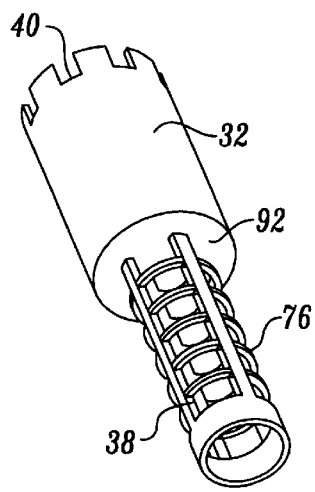
FIG. 17 is a perspective view of the outer tube and second inner tube of FIG. 16.

Referring to FIGS. 16 and 17, a fourth embodiment of a muffler formed in accordance with the present invention is shown in which a second inner tube 76 is provided below the outer tube 32. The second inner tube 76 has an open distal end and a closed proximal end. As shown in FIG. 17, the second inner tube 76 is preferably integrally formed with the outer tube 32, extending downward from an outer tube lower surface 92. The second inner tube 76 includes one or more openings along its side walls. The open distal end of the second inner tube 76 is located adjacent the exit opening 46 of the end cap. Alternatively, a lower plate may be used at the second inner tube distal end to route exhaust air into the exit openings 46.

During use, exhaust air enters the proximal end of the first inner tube 30, flows out the first inner tube at least one opening, flows out the at least one airflow opening 40 of the outer tube, passes through the passageway 42 between the outer tube and the wall surfaces of the main section, flows into the at least one opening of the second inner tube 76, out the open distal end of the second inner tube, and out the exit opening 46 in the end cap. A number of washers 58 may be positioned about the second inner tube to further slow the exhaust air.

As in previous embodiments, the inner tubes may take on a variety of shapes and sizes. The second inner tube of FIG. 17 is formed as a cylindrical grid or cage. Further, while the first and second inner tubes are shown as being approximately the same size, this ratio may varying depending on the particular application and hand tool involved.

Figure 19:
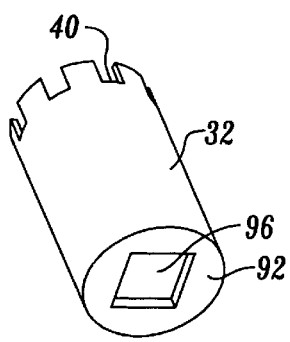
FIG. 19 is a perspective view of the outer tube of FIG. 18.
Figure 18:
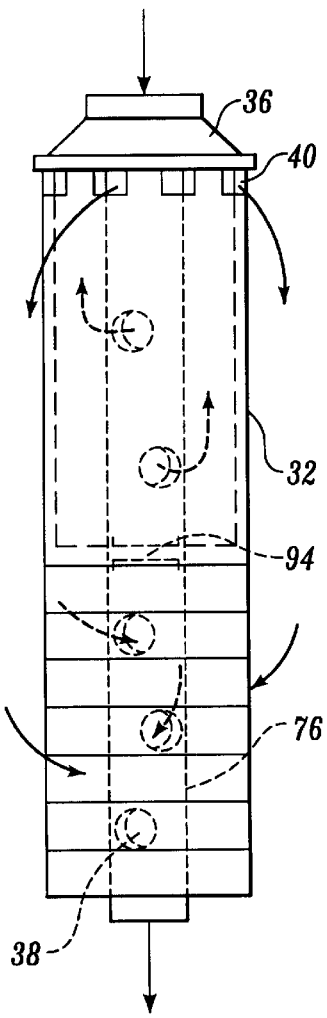
FIG. 18 is a side view of a fifth embodiment of a muffler formed in accordance with the present invention.
Figure 20:
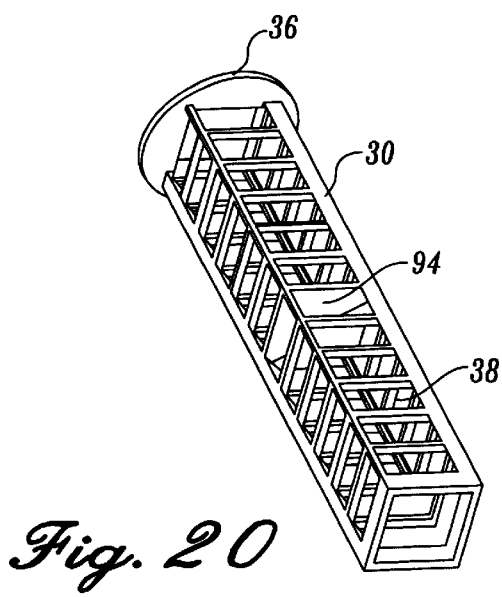
FIG. 20 is a perspective view of the inner tube of FIG. 18.

Referring to FIGS. 18, 19, and 20, a fifth embodiment of a muffler formed in accordance with the present invention is provided. This embodiment is similar to the fourth embodiment, except the first and second inner tubes are integrally formed as one elongated inner tube 30. A cutoff wall 94 is located between the first and second inner tubes so as to prohibit exhaust air flow therethrough. The outer tube 32 includes a bottom opening 96 in its lower surface. See FIG. 19. As assembled, the inner tube 30 extends through the bottom opening. The cutoff wall is coplanar with the outer tube lower surface. The size of the inner tube and the bottom opening are matched so that exhaust air is prohibited from flowing directly out the bottom opening of the outer tube.

As will be appreciated from a reading of the above, a number of variations are possible using the teachings herein. For example, the outer tube of FIG. 7 may be modified with an opening in its cutoff wall to mate with the elongated inner tube of FIG. 20. By way of further example, the outer tube of FIG. 17 may be modified by the addition of a second compartment 72 surrounding the second inner tube. Numerous other variations exist. Important to the present invention is the object of slowing exhaust air as it exits the hand tool by forcing the exhaust air through various twist and turns. Also important is providing a combination of components sufficient for filtering and noise dampening without undue disruption of efficient tool operation, and particularly without undesirable levels of backpressure.

Figure 21:
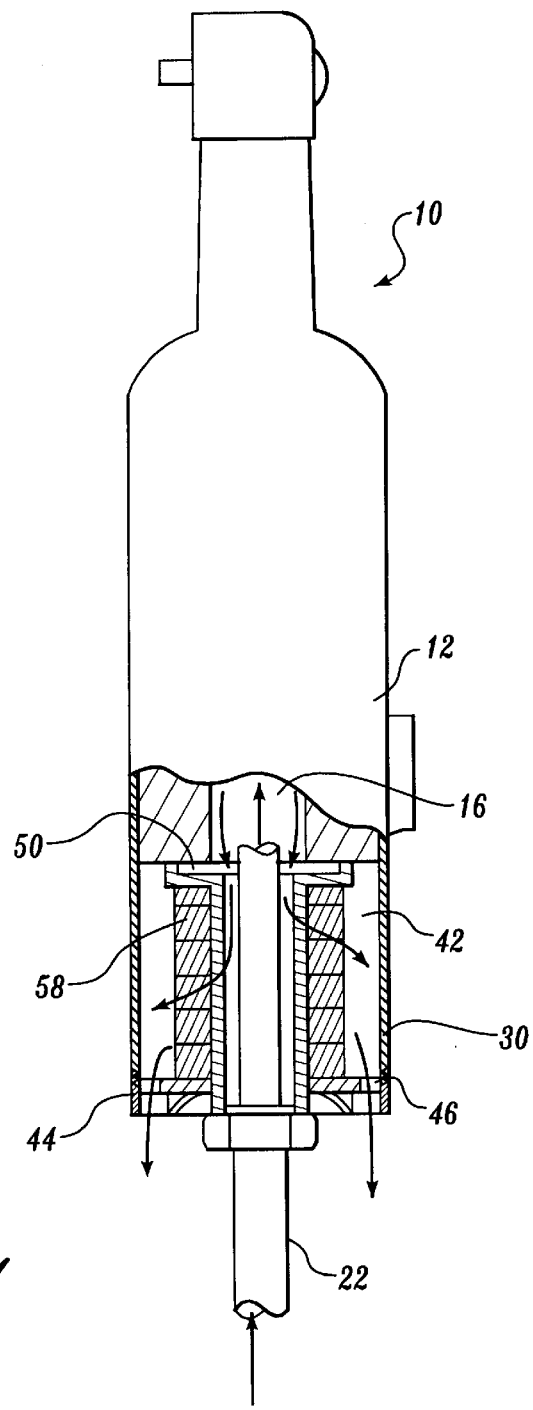
FIG. 21 is a partial cross-sectional side view of an alternative muffler embodiment.
Figure 22:
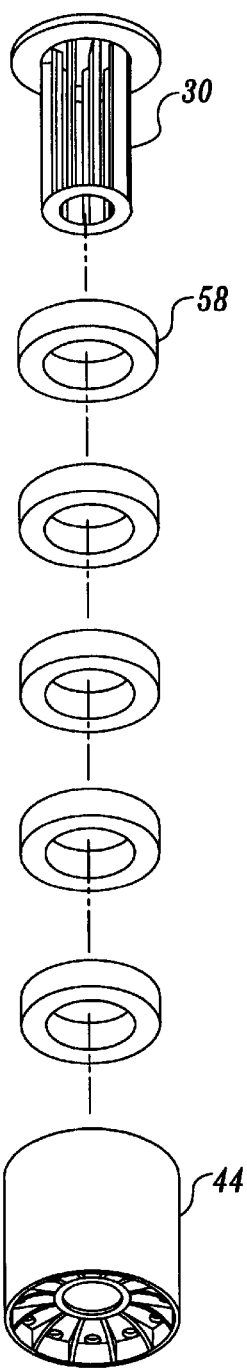
FIGS. 22, 23, and 24 are perspective views of components of FIG. 21.
Figure 23:
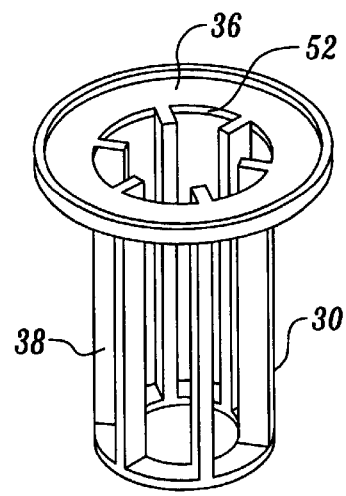
Figure 24:
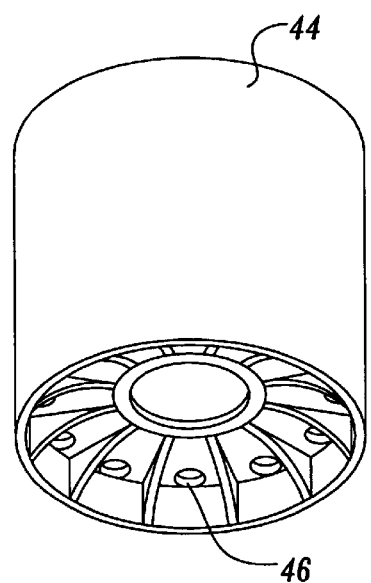

Referring to FIGS. 21–24, an alternative embodiment of a muffler is provided for use with a hand tool having an exhaust passage through which the air intake supply line passes. The muffler includes an inner tube 30 disposed about the supply line and adapted to accept exhaust air from the exhaust passage. A number of washers 58 are optionally placed around the inner tube 30. In FIG. 22 the hand tool hand is extended by an end cap 44 having sufficient volume to hold the inner tube 30 and washers 58. The end cap 44 includes exit openings 46 in its lower and/or side surfaces. In one embodiment, the end cap 44 is attached to the bottom surface of the hand tool handle using conventional fastening means. In another embodiment as shown in FIG. 21, the size and shape of the handle itself is altered to accommodate the muffler components, with the end cap 44 simply capping the newly elongated handle. During use, exhaust air travels into the inner tube, flows out the inner tube openings and into the washers, flows out the remaining portion of the end cap 44 (or handle 12), and out the exiting openings.

Figure 25:
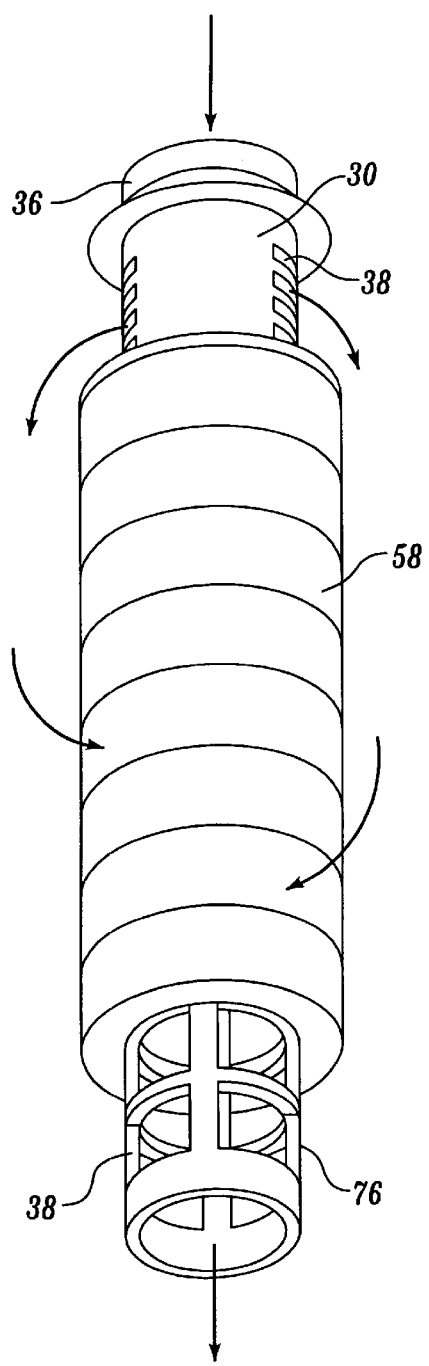
FIGS. 25 and 26 are perspective views of yet another alternative muffler embodiment.
Figure 26:
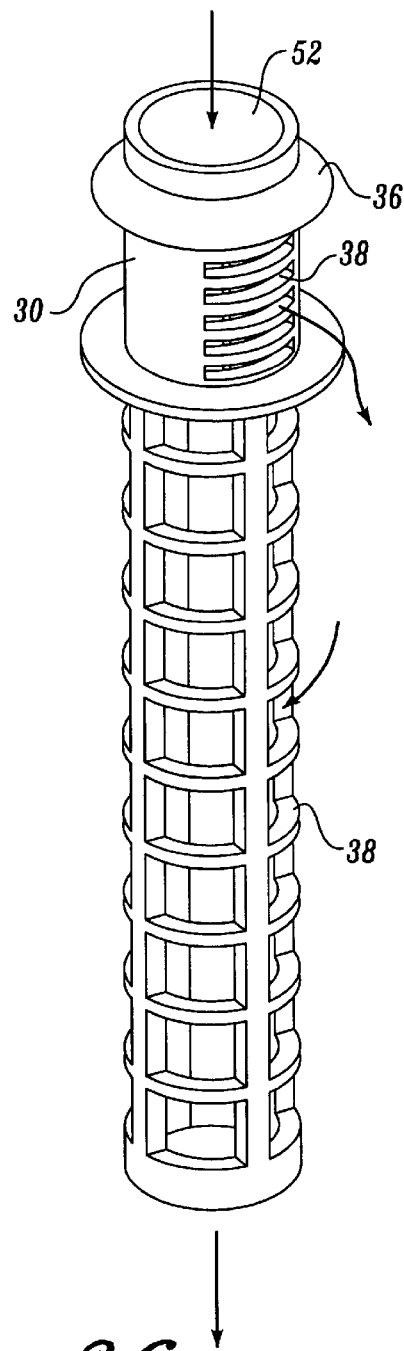

FIGS. 25 and 26 are perspective views of yet another alternative muffler embodiment. In this arrangement, the inner tube 30 is formed similar to the arrangement of FIG. 20. A second inner tube is positioned below and attached to a first inner tube. A cutoff wall (not shown) is located between the two inner tube portions. A number of washers 58 are placed about the second inner tube. During use, exhaust air flows into the open proximal end of the first inner tube, out first inner tube openings and around the cutoff wall, into the second inner tube, out the distal end opening of the second inner tube, and out the exit openings 46. This embodiment of an inner tube may be used with or without an outer tube 32.

While the preferred embodiment of the invention has been illustrated and described, it will be appreciated that various changes can be made therein without departing from the spirit and scope of the invention. For example, relief openings (not shown) may be used in the blocking plates and/or cutoff walls to relieve unexpected or sudden pressure surges. By way of further example, many different sizes, shapes, and placements of openings that may be used with the various components. In addition, the cross-sectional shape of the inner and outer tubes may be of any shape.

The embodiments of the invention in which an exclusive property or privilege is claimed are defined as follows:

1. In a pneumatic hand tool having a handle with an exhaust passage including a main section having wall surfaces, a muffler improvement comprising:
   (a) an inner tube having an open proximal end and a distal end, the inner tube including at least one opening in addition to its open proximal end;
   (b) an outer tube positioned about the inner tube and including at least one airflow opening; the combination of inner tube and outer tube being located within the exhaust passage main section; the outer tube being sized to provide a passageway between itself and the wall surfaces of the main section;
   (c) an upper plate located near the inner tube proximal end; the upper plate closing off the exhaust passage main section such that a majority of the exhaust air is directed into the inner tube proximal end during use; and
   (d) an end cap attachable to the handle for closing off the exhaust passage, the end cap having an exit opening;
   wherein during use, exhaust air enters the inner tube proximal end, flows out the inner tube at least one opening, flows out the outer tube at least one airflow opening, passes through the passageway between the outer tube and the wall surfaces of the main section, and flows out the exit opening in the end cap; whereby the tortuous path slows the exhaust air and assists in dampening exhaust noise.

2. The muffler according to claim 1, wherein the inner tube is formed of at least one of a hard elastomer, metal, fiber material and rigid cloth.

3. The muffler according to claim 1, wherein there are a plurality of openings in the inner tube side surfaces.

4. The muffler according to claim 1, wherein there are a plurality of airflow openings in the outer tube side surfaces.

5. The muffler according to claim 1, wherein the main section includes an upper shoulder, the upper plate being formed to contact the upper shoulder to force all exhaust air into the inner tube proximal end during use.

6. The muffler according to claim 1, further comprising a number of washers positioned about the inner tube.

7. The muffler according to claim 6, wherein the number of washers are formed from a material in the group comprising felt, gauze, rubber, foam, and synthetic material.

8. The muffler according to claim 1, further comprising a number of dividers spacedly positioned about the inner tube, each divider extending outwardly from the inner tube exterior surface toward the outer tube inner surface.

9. The muffler according to claim 8, further comprising a number of washers positioned about the inner tube between dividers.

10. The muffler according to claim 1, wherein the upper plate cap closes off the outer tube proximal end, the outer tube distal end is closed, and during use, substantially all exhaust air enters the inner tube proximal end, flows out the outer tube at least one airflow opening, passes through the passageway between the outer tube and the wall surfaces of the main section, and then flows directly out the end cap exit opening.

11. The muffler according to claim 10, further comprising a number of washers positioned about the inner tube.

12. The muffler according to claim 10, further comprising a number of dividers spacedly positioned about the inner tube, each divider extending outwardly from the inner tube exterior surface toward the outer tube inner surface.

13. The muffler according to claim 12, further comprising a number of washers positioned about the inner tube between dividers.

14. The muffler according to claim 10, wherein the at least one airflow opening of the outer tube includes a plurality of longitudinal slots.

15. The muffler according to claim 10, wherein the upper plate is integrally formed at the proximal end of the outer tube.

16. The muffler according to claim 10, wherein the at least one opening in the inner tube is located along inner tube side walls.

17. The muffler according to claim 10, wherein the inner tube distal end is closed.

18. The muffler according to claim 1, further comprising a second inner tube located below the first inner tube; the second inner tube having an open distal end and a proximal end; the second inner tube including at least one opening in addition to its open distal end; the exit opening of the end cap located adjacent the open distal end; wherein during use, after the exhaust air passes into the passageway between the outer tube and the wall surfaces of the main section, the exhaust air flows into the at least one opening of the second inner tube, out the open distal end of the second inner tube, and out the end cap exit opening.

19. In a pneumatic hand tool having a handle with an exhaust passage including a main section, a muffler improvement comprising:
   (a) a first inner tube having an open proximal end and a distal end, the inner tube including at least one opening in addition to its open proximal end;
   (b) a second inner tube located below the first inner tube; the second inner tube having an open distal end and a proximal end; the second inner tube including at least one opening in addition to its open distal end;
   (c) an outer tube having two compartments, the first inner tube being located in the first compartment and the second inner tube being located in the second compartment; the outer tube including at least one airflow opening in each compartment; the outer tube being sized to provide a passageway between itself and the wall surfaces of the main section; and
   (d) an upper plate located near the first inner tube proximal end; the upper plate closing off the exhaust passage main section such that a majority of the exhaust air is directed into the first inner tube proximal end during use;
   (e) an end cap attachable to the handle for closing off the exhaust passage, the end cap having an exit opening;
   wherein during use, exhaust air enters the inner tube proximal end, flows out the inner tube at least one opening, flows out the at least one airflow opening of the outer tube first compartment, passes through the passageway between the outer tube and the wall surfaces of the main section, flows into the at least one airflow opening of the outer tube second compartment, flows into the at least one opening of the second inner tube, out the open distal end of the second inner tube, and out the exit opening in the end cap; whereby the tortuous path slows the exhaust air and assists in dampening exhaust noise.

20. The muffler according to claim 19, wherein the first and second outer tube compartments are completely closed off from one another.

21. The muffler according to claim 19, wherein the main section includes an upper shoulder, the upper plate being formed to contact the upper shoulder to force all exhaust air into the inner tube proximal end during use.

22. The muffler according to claim 19, wherein the upper plate is integrally formed at the proximal end of the first inner tube.

23. The muffler according to claim 19, further comprising a lower plate located near the second inner tube distal end and adjacent the exit opening of the end cap; the lower plate closing off the exhaust passage main section such that during use substantially all exhaust air must flow through the second inner tube in order to exit the muffler.

24. The muffler according to claim 23, wherein the lower plate is integrally formed at the distal end of the second inner tube.

25. The muffler according to claim 19, wherein there are a plurality of openings in both the first and second inner tube side surfaces.

26. The muffler according to claim 19, wherein there are a plurality of airflow openings in the side surfaces of both the first and second compartments of the outer tube.

27. The muffler according to claim 19, wherein the first and second compartments of the outer tube are approximately the same size.

28. In a pneumatic hand tool having a handle with an exhaust passage including a main section, a muffler improvement comprising:
  (a) a first inner tube having an open proximal end and a distal end, the inner tube including at least one opening in addition to its open proximal end;
  (b) a second inner tube having an open distal end and a proximal end; the second inner tube including at least one opening in addition to its open distal end;
  (c) an outer tube having a lower surface; the first inner tube being located in the outer tube; the second inner tube extending downward from the outer tube lower surface; the outer tube including at least one airflow opening; the outer tube being sized to provide a passageway between itself and the wall surfaces of the main section;
  (d) an upper plate located near the first inner tube proximal end; the upper plate closing off the exhaust passage main section such that a majority of the exhaust air is directed into the first inner tube proximal end during use; and
  (e) an end cap attachable to the handle for closing off the exhaust passage, the end cap having an exit opening;
  wherein during use, exhaust air enters the inner tube proximal end, flows out the inner tube at least one opening, flows out the at least one airflow opening of the outer tube, passes through the passageway between the outer tube and the wall surfaces of the main section, flows into the at least one opening of the second inner tube, out the open distal end of the second inner tube, and out the exit opening in the end cap; whereby the tortuous path slows the exhaust air and assists in dampening exhaust noise.

29. The muffler according to claim 28, wherein there are a plurality of openings in both the first and second inner tube side surfaces.

30. The muffler according to claim 28, wherein there are a plurality of airflow openings in the side surfaces of the outer tube.

31. The muffler according to claim 28, wherein the main section includes an upper shoulder, the upper plate being formed to contact the upper shoulder to force all exhaust air into the inner tube proximal end during use.

32. The muffler according to claim 28, further comprising a number of washers positioned about the second inner tube.

33. The muffler according to claim 28, wherein the end cap closes off the main section except at the location of the second inner tube open distal end.

34. The muffler according to claim 28, wherein the upper plate is integrally formed at the proximal end of the first inner tube.

35. The muffler according to claim 28, wherein during use all exhaust air must pass out the outer tube and into the second inner tube in order to exit the muffler.

36. The muffler according to claim 28, wherein the proximal end of the second inner tube is attached to the distal end of the outer tube, the second inner tube and the outer tube being closed off from one another to cause all exhaust air to pass out the outer tube prior to entering the second inner tube.

37. The muffler according to claim 28, wherein the second inner tube is integrally formed at the distal end of the outer tube.

38. The muffler according to claim 28, wherein the outer tube and the second inner tube are of approximately the same length.

39. In a pneumatic hand tool having a handle with an exhaust passage including a main section, a muffler improvement comprising:
  (a) a first inner tube having an open proximal end and a distal end, the inner tube including at least one opening in addition to its open proximal end;
  (b) a second inner tube having an open distal end and a proximal end; the second inner tube located below the first inner tube and fixedly attached thereto; a cutoff wall located between the first and second inner tubes so as to prohibit airflow therethrough; the second inner tube including at least one opening in addition to its open distal end;
  (c) an outer tube having proximal and distal ends, the distal end including a bottom opening; the inner tube extending through the outer tube with the first inner tube being located in the inner tube and the second inner tube extending therebelow; the cutoff wall being positioned at the bottom opening; the outer tube including at least one airflow opening in addition to its bottom opening; the outer tube being sized to provide a passageway between itself and the wall surfaces of the main section; and
  (d) an upper plate located near the first inner tube proximal end; the upper plate closing off the exhaust passage main section such that a majority of the exhaust air is directed into the first inner tube proximal end during use;
  (e) an end cap attachable to the handle for closing off the exhaust passage, the end cap having an exit opening;
  wherein during use, exhaust air enters the inner tube proximal end, flows out the inner tube at least one opening, flows out the at least one airflow opening of the outer tube, passes through the passageway between the outer tube and the wall surfaces of the main section, flows into the at least one opening of the second inner tube, out the open distal end of the second inner tube, and out the exit opening in the end cap; whereby the tortuous path slows the exhaust air and assists in dampening exhaust noise.

40. The muffler according to claim 39, wherein there are a plurality of openings in both the first and second inner tube side surfaces.

41. The muffler according to claim 39, wherein there are a plurality of airflow openings in the side surfaces of the outer tube.

42. The muffler according to claim 39, wherein the main section includes an upper shoulder, the upper plate being formed to contact the upper shoulder to force all exhaust air into the inner tube proximal end during use.

43. The muffler according to claim 39, further comprising a number of washers positioned about the second inner tube.

44. The muffler according to claim 39, wherein the end cap closes off the main section except at the location of the second inner tube open distal end.

45. The muffler according to claim 39, wherein the upper plate is integrally formed at the proximal end of the first inner tube.

46. The muffler according to claim 39, wherein during use all exhaust air must pass out the outer tube and into the second inner tube in order to exit the muffler.

47. The muffler according to claim 39, wherein the first and the second inner tubes are of approximately the same length.

* * * * *

UNITED STATES PATENT AND TRADEMARK OFFICE
CERTIFICATE OF CORRECTION

PATENT NO. : 6,668,971 B2
DATED : December 30, 2003
INVENTOR(S) : R.E. Sterling

It is certified that error appears in the above-identified patent and that said Letters Patent is hereby corrected as shown below:

<u>Title page,</u>
Item [57], ABSTRACT,
Line 11, "penguins," should read -- openings, --

<u>Column 8,</u>
Line 48, "section; and" should read -- section; --
Line 53, "use;" should read -- use; and --

<u>Column 10,</u>
Line 53, "section; and" should read -- section; --
Line 58, "use;" should read -- use; and --

Signed and Sealed this

Fifteenth Day of June, 2004

JON W. DUDAS
*Acting Director of the United States Patent and Trademark Office*